3,160,658
SYNTHESES OF SPIRILLOXANTHIN

Joseph Donald Surmatis, West Caldwell, N.J., assignor to Hoffmann-La Roche Inc., Nutley, N.J., a corporation of New Jersey
No Drawing. Original application May 31, 1962, Ser. No. 198,719. Divided and this application Mar. 4, 1963, Ser. No. 262,305
5 Claims. (Cl. 260—543)

This invention relates to methods for the synthesis of spirilloxanthin and to novel intermediates therefor.

Spirilloxanthin, sometimes called rhodoviolasin, is a known carotenoid [see, e.g. Karrer and Koenig, Helv. Chim. Acta, 23, 460 (1940)], useful as a natural coloring agent for feedstuffs and foodstuffs.

The present invention relates to two processes which have now been discovered for its total synthesis. The processes of the invention are as follows:

(1) 6-methyl-5-hepten-2-one (I) is treated with methyl alcohol and concentrated sulfuric acid in the cold, i.e. at a temperature in the range of 0° to 10° C. Then the reaction mixture is made alkaline, preferably with an aqueous alkali metal hydroxide, e.g. sodium hydroxide, to give 6-methoxy-6-methyl-heptan-2-one (II). Alternatively, the reaction can be carried out by heating 6-methyl-5-hepten-2-one (I) with methyl alcohol and an aromatic sulfonic acid such as p-toluenesulfonic acid, or benzene sulfonic acid, preferably the former. The 6-methoxy-6-methyl-heptan-2-one (II) is then reacted in a Reformatsky reaction, e.g. by treatment with bromoethylacetate, potassium bromide, and zinc metal followed by acidification of the solution, e.g. with aqueous mineral acid, to produce ethyl 3-hydroxy-3,7-dimethyl-7-methoxyoctanoate (III). The latter compound is then dehydrated with a dehydrating agent, e.g. phosphorus oxychloride and pyridine, or heat, preferably in the presence of a trace of an acid catalyst or iodine, to form ethyl 3,7-dimethyl-7-methoxy-2-octenoate (IV). The latter compound is treated with N-bromosuccinimide and dehydrohalogenated by heating to form ethyl 3,7-dimethyl-7-methoxy-octa-2,4-dienoate (V). This compound is then reduced with a group I-group III mixed metal hydride, e.g. lithium aluminum hydride, to 3,7-dimethyl-7-methoxy-octa-2,4-dien-1-ol (VI). The latter compound is reacted with triphenyl phosphorus hydrobromide to form 3,7-dimethyl-7-methoxy-octa-2,4-dien-1-yl triphenyl phosphorus bromide (VII), which in turn is reacted with crocetin dialdehyde in the presence of an alkali metal alcoholate such as sodium methylate to give spirilloxanthin (VIII).

The reaction scheme for the preparation is given below.

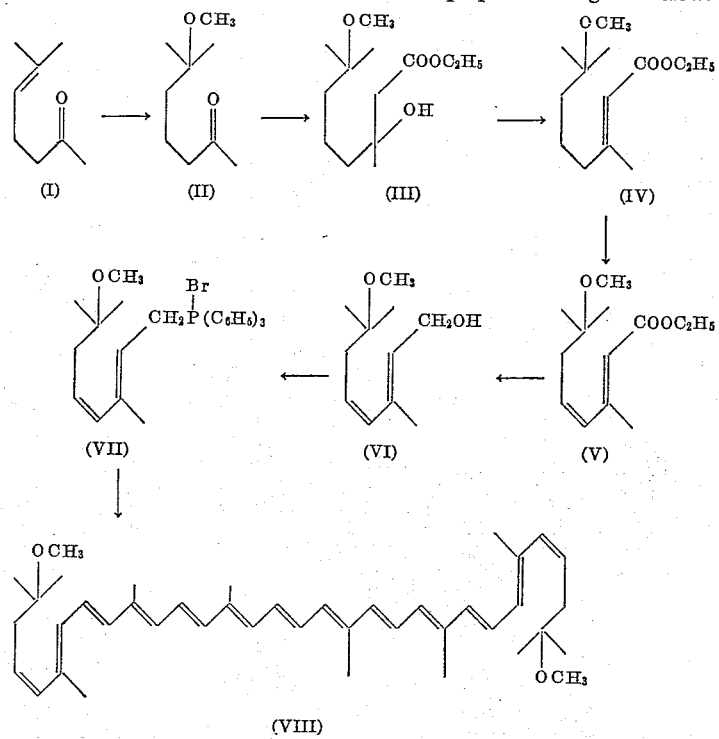

(2) The second method of preparation is as follows: 6-methoxy-6-methyl-heptan-2-one (II) is treated with sodium acetylide to form 3-hydroxy-7-methoxy-3,7-dimethyl-octa-1-yne (IX). The latter compound is hydrogenated in the presence of a lead-palladium-calcium carbonate catalyst [Lindlar, Helv. Chim. Acta, 35, 442, (1952)] to form 3-hydroxy-7-methoxy - 3,7 - dimethylocta-1-ene (X). This compound is reacted with triphenyl phosphorus hydrobromide to yield 7-methoxy-3,7-dimethyl-octa-2-en-1-yl triphenyl phosphorus bromide (XI). The latter compound is reacted with crocetin dialdehyde to give 1,1'-dimethoxy-1,1',2,2'-tetrahydrolycopene (XII). Then the latter compound is treated with N-bromosuccinimide and dehydrobrominated to yield spirilloxanthin (VIII).

The reaction scheme for the preparation is given below.

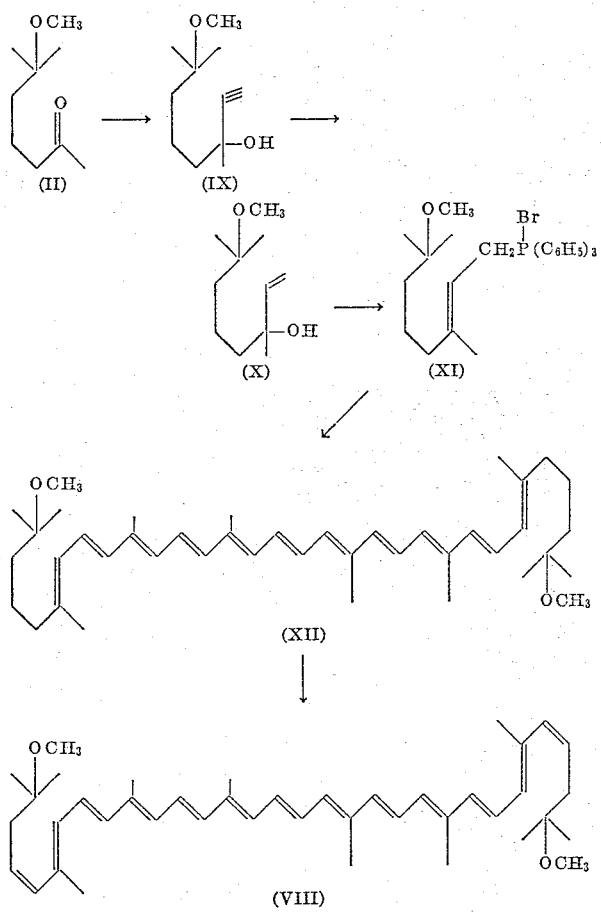

The process of the invention will be better understood by reference to the following examples which are given for illustration purposes only and are not meant to limit the invention.

EXAMPLE 1

(a) *Preparation of 6-Methoxy-6-Methyl-Heptan-2-One (II)*

In a 12-liter round-bottom flask fitted with a thermometer and a stirrer is placed 4 liters of methyl alcohol. The flask is cooled in an ice bath until the temperature of the methyl alcohol is 10° C. or lower. Then 800 ml. of concentrated sulfuric acid is slowly dropped into the methyl alcohol over a period of one hour while cooling and stirring. 2 kg. of 6-methyl-5-hepten-2-one (I) is added to the cool reaction mixture all at once with vigorous stirring. The ice bath is removed and the stirring continued for 8 hours. The stirring is then stopped and the reaction mixture allowed to stand at room temperature for 8 hours. The reaction mixture is poured into 10 liters of ice water and to the resulting mixture 900 ml. of 30% aqueous sodium hydroxide solution is added. The alkaline reaction mixture is stirred for one hour, the oil separated off, and the aqueous portion extracted 4 times, each time with 1 liter of benzene. The oil and the benzene extracts are combined and washed until neutral with water. The benzene is removed by distillation under the vacuum of a water pump, and the residual oil fractionated; boiling point 107–109° C. at 25 mm.

An alternative process for the preparation of 6-methoxy-6-methyl-heptan-2-one (II) is as follows: In a 12-liter round-bottom flask provided with a stirrer, condenser, and thermometer is added 5 liters of methyl alcohol, 2 kg. of 6-methyl-5-hepten-2-one (I), and 80 g. of para-toluene sulfonic acid. The solution is stirred at reflux temperature for 24 hours. The methyl alcohol is removed by distillation under the vacuum of a water pump. The residual oil is washed two times, each time with 2 liters of water. The water washes are combined and extracted with 500 ml. of benzene. The residual oil is then combined with the benzene extract and the benzene removed by distillation with a water pump. The residual oil is then fractionally distilled; boiling point 82–84° C. at 9 mm. mercury.

(b) *Preparation of Ethyl 3-Hydroxy-3,7-Dimethyl-7-Methoxyoctanoate (III)*

In a 2-liter round-bottom flask fitted with a stirrer, condenser, and thermometer is added 300 g. of bromoethyl-acetate, 15 g. of potassium bromide, 750 ml. of benzene, and 200 g. of 6-methoxy-6-methyl-5-heptan-2-one (II). The condenser is fitted for distillation and a small quantity of benzene distilled off until no cloudiness is detectable in the distillate. The condenser is then returned to a reflux position and 150 g. of zinc slowly added to the reaction mixture at such a rate as to maintain vigorous reflux. Two hours are required to add all of the zinc. The reaction mixture is then stirred until cool and diluted with 1 liter of water. Aqueous 5% sulfuric acid is added slowly with stirring until all of the solid which forms on dilution with water is dissolved. The upper oil layer is separated and the aqueous portion extracted with benzene. The oil and the benzene extract are combined, washed with water, and then with sodium bicarbonate solution. The benzene is removed under the vacuum of a water pump, and the residue fractionally distilled. 224 g. (72.3%) of ethyl 3-hydroxy-3,7-dimethyl-7-methoxyoctanoate (III) of boiling point 117° C. at 0.5 mm. is obtained.

(c) *Preparation of Ethyl 3,7-Dimethyl-7-Methoxy-2-Octenoate (IV)*

In a 5-liter round-bottom flask fitted with a stirrer, thermometer, and condenser are placed 270 ml. of phosphorus oxychloride, 1 liter of pyridine, and 1 liter of toluene, in that order. Then 703 g. of ethyl 3-hydroxy-3,7-dimethyl-7-methoxyoctanoate (III) is dropped into the stirred reaction mixture over the course of 30 minutes, causing the temeprature to rise to 95° C. The reaction mixture is then stirred at 95–100° C. for two hours with external heating. The solution is then cooled and poured into 5 liters of ice water. The oil layer is separated and the water layer extracted with 1 liter of toluene. The combined oil layer and toluene extract are washed with 2 liters of water, 2 liters of 5% sulfuric acid, 2 liters of water, and lastly 2 liters of 5% sodium bicarbonate solution. The solvent is removed under vacuum and the product fractionally distilled. 452 g. (69.5%) of ethyl 3,7-dimethyl-7-methoxy-2-octenoate (IV) of boiling point 75° C. at 0.1 mm. is obtained.

(d) *Preparation of Ethyl 3,7-Dimethyl-7-Methoxy-Octa-2,4-Dinoate (V)*

In a 5-liter round-bottom flask fitted with a stirrer, condenser, thermometer, and nitrogen inlet tube are placed 430 g. of ethyl 3,7-dimethyl-7-methoxy-2-octenoate (IV), 2.5 liters of carbon tetrachloride, 200 g. of sodium bicarbonate, 160 g. of calcium oxide, and 500 g. of N-bromosuccinimide, in the order named. The reaction mixture is heated under nitrogen until a light refluxing commences. The heating source is quickly removed, since the heat of reaction causes a vigorous boiling which continues for about 10 minutes. When the boiling stops, the heating is resumed and the reaction mixture stirred under reflux for an additional hour. Thereafter the flask is inserted into a cold water bath and 400 ml. of quinoline added to the reaction mixture. The solid portion of the reaction mixture is filtered off by suction and washed with carbon tetrachloride. The solvent in the filtrate is removed by distillation under the vacuum of a water pump. The residue is heated under a nitrogen atmosphere for 2 hours at 95–100° C. The residue is allowed to cool to 60° C., and 200 ml. of pyridine is added and the heating continued for one hour at 95–110° C. The reaction mixture is cooled, poured into four liters of water, and extracted three times, each time with 2 liters of petroleum ether (boiling point 30–60° C.). The petroleum ether extracts are combined and washed 4 times, each time with 1 liter of 5% sulfuric acid; then twice, each time with 1 liter of water; then with 1 liter of 5% sodium bicarbonate solution; and lastly with 1 liter of water. The organic layer is dried over anyhdrous calcium sulfate and the solvent removed under the vacuum of a water pump. The residue is distilled under a high vacuum oil pump. 212 g. (50%) of ethyl 3,7-dimethyl-7-methoxy-octa-2,4-dienoate (V) of boiling point 75–115° C. at 0.3 mm. is obtained. An analytically pure sample is obtained by distillation; boiling point 80° C. at 0.15 mm.

(e) *Preparation of 3,7-Dimethyl-7-Methoxy-Octa-2,4-Dien-1-Ol (VI)*

In a 5-liter flask fitted with a stirrer, thermometer, and dropping funnel are added 2 liters of ethyl ether and 40 g. of lithium aluminum hydride. The resulting mixture is stirred for 30 minutes at room temperature, and the mixture cooled to −10° C. Then 150 g. of ethyl 3,7-dimethyl-7-methoxy-octa-2,4-dienoate (V) is added over a one-hour period. The cooling bath is removed and the reaction mixture stirred for ten hours. The mixture is cooled to −10° C. and a 5% solution of sulfuric acid added drop by drop until the excess lithium aluminum hydride is decomposed. Then a sufficient quantity of 5% sulfuric acid is added to dissolve the precipitated solid. The oil layer is removed and the water layer extracted with additional ether. The ether extracts and oil layer are combined, washed with water, and dried over anhydrous calcium sulfate. The ether is removed by distillation under the vacuum of a water pump. 126 g. (100%) of crude product is obtained. The product, 3,7-dimethyl-7-methoxy-octa-2,4-dien-1-ol (VI), is fractionally distilled; boiling point 78° C. at 0.1 mm.

(f) *Preparation of 3,7-Dimethyl-7-Methoxy-Octa-2,4-Dien-1-Yl Triphenyl Phosphorus Bromide (VII)*

In a 2-liter flask provided with a stirrer and a nitrogen inlet tube are added 1 liter of methyl alcohol, 178 g. of triphenyl phosphorus hydrobromide, and 96 g. of crude 3,7 - dimethyl-7-methoxy-octa-2,4,-dien-1-ol (VI) The mixture is stirred under a nitrogen atmosphere for 48 hours at room temperature. The solution is filtered, diluted with two volumes of water, and extracted with methylene chloride. The methylene chloride extracts are combined washed twice with water, and concentrated under the vacuum of a water pump to a thick syrup. The syrupy residue is washed twice, each time with 500 ml. of ethyl ether. Then 1 liter of ethyl acetate is added and stirring continued at room temperature until most of the product is crystallized. The ethyl acetate mixture is held at 0° C. for eight hours, after which the crude product is filtered by suction, washed with ethyl acetate, and dried in a vacuum oven at 50° C. 105 g. (39.6%) of 3,7 - dimethyl - 7-methoxy-octa-2,4-dien-1-yl triphenyl phosphorus bromide (VII) is obtained. After recrystallization from methylene chloride-ethyl acetate, 66 g. (25%) of pure compound is obtained; melting point 168° C.

(g) *Preparation of Spirilloxanthin (VIII)*

In a 1-liter round-bottom flask fitted with a stirrer, condenser, thermometer, and nitrogen inlet tube are added 600 ml. of methyl alcohol and 5 g. of metallic sodium. When the sodium is all dissolved, the contents of the flask are cooled to −20° C. and 50 g. of 3,7-dimethyl-7-methoxy-octa-2,4-dien-1-yl triphenyl phosphorus bromide (VII) is added all at once and the mixture stirred for 10 minutes. Then 10 g. of crocetin dialdehyde is added and the cold bath removed. The flask is placed on a hot water bath and the reaction stirred under nitrogen at reflux temperature for 4 hours. The reaction mixture is cooled for 8 hours at 0° C. and filtered by suction. The product is obtained as glistening violet-black crystals. The crude product yield is 18 g.; melting point 180–191° C. After five recrystallizations from benzene an analytically pure sample of spirilloxanthin (VIII) (6.5 g.) is obtained; melting point in a bath preheated to 200° C. is 217° C. (uncorrected).

EXAMPLE 2

(a) *Preparation of 3-Hydroxy-7-Methoxy-3,7-Dimethyl-octa-1-Yne (IX)*

28 g. of metallic sodium is dissolved in 1 liter of liquid ammonia. Acetylene is bubbled into the stirred solution until the color of the solution changes from blue to white. 158.2 g. of 6-methoxy-6-methyl-heptan-2-one (II) (prepared as in Example 1) is dissolved in 150 ml. of diethyl ether and dropped into the stirred reaction mixture during the course of one hour. The stirring is then continued for three hours while a slow stream of acetylene is bubbled in. The acetylene introduction is then stopped and the stirring continued for about 15 hours. The ammonia is distilled off and the residue in the reaction vessel washed with 1 liter of 5% sulfuric acid solution. The product is then washed with water, dried over anhydrous calcium sulfate, and fractionally distilled to yield 157 g. (85%) of 3-hydroxy-7-methoxy-3,7-dimethyl-octa-1-yne (IX); boiling point 112° C. at 8 mm. of mercury.

(b) *Preparation of 3-Hydroxy-7-methoxy-3,7-Dimethyl-octa-1-Ene (X)*

184.3 g. of 3-hydroxy-7-methoxy-3,7-dimethylocta-1-yne (IX), 15 g. of 5% lead-palladium-calcium carbonate catalyst [Lindlar, Helv. Chim. Acta, 35, 446 (1952)], and 150 ml. of petroleum ether are placed in a flask provided with a stirrer and the mixture hydrogenated at 20–25° C. at one atmosphere hydrogen pressure until 1 mol. of hydrogen is consumed. The product is fractionally distilled to yield 168 g. (90%) of 3-hydroxy-7-methoxy-3,7-dimethylocta-1-ene (X); boiling point 107° C. at 8 mm. pressure.

(c) *Preparation of 7-Methoxy-3,7-Dimethylocta-2-En-1-Yl Triphenyl Phosphorus Bromide (XI)*

186.3 g. of 3-hydroxy-7-methoxy-3,7-dimethylocta-1-ene (X) and 312.2 g. of triphenyl phosphorus hydrobromide are placed in 1860 ml. of methyl alcohol and stirred under a blanket of nitrogen at room temperature for 48 hours. The solution is diluted with 3 liters of water, then extracted 3 times with 600 ml. of methylene chloride. The extracts are combined, washed with 2 liters of water, and concentrated under vacuum. 2 liters of ethyl acetate are added to the syrup. The mixture is stirred for 1 hour and cooled for 8 hours at 0° C. A white crystalline solid, 7-methoxy-3,7-dimethylocta-2-en-1-yl triphenyl phosphorus bromide (XI), is filtered by suction, washed with ethyl acetate, and dried in a vacuum oven at 50° C. 384 g. (80%) of product of melting point 168–171° C. is obtained.

(d) *Preparation of 1,1'-Dimethoxy-1,1',2,2'-Tetrahydrolycopene (XII)*

1.4 g. of metallic lithium is placed in 100 cc. of diethyl ether and reacted with 17.3 g. of bromobenzene. 43.6 g. of 7-methoxy-3,7-dimethylocta-2-en-1-yl triphenyl phosphorus bromide (XI) is added. 8.0 g. of crocetin dialdehyde is added as a dry powder at such a rate as to induce reflux. After the addition, the reaction is refluxed for 2 more hours, cooled to 10° C., diluted with 200 ml. of cold water, and filtered. The precipitate is washed with water, methyl alcohol, and petroleum ether. The crude product weighs 12.9 g. after drying; melting point 154° C. After recrystallization from pyridine and then from benzene, 9.7 g. of 1,1'-dimethoxy-1,1',2,2'-tetrahydrolycopene (XII), melting point 168° C., is obtained.

*(e) Preparation of Spirilloxanthin (VIII)*

20 g. of 1,1'-dimethoxy-1,1',2,2'-tetrahydrolycopene (XII) is dissolved in 500 ml. of chloroform. 20 g. of calcium oxide, 20 g. of sodium bicarbonate, and 14 g. of N-bromosuccinimide are added to the reaction mixture in the order given. The reaction mixture is stirred for two minutes under a blanket of nitrogen. Then 20 cc. of dimethylaniline are added and the reaction mixture stirred under reflux for 1 hour. 10 cc. of pyridine are added and the stirring and refluxing continued for an additional hour. The cool solution is filtered and the solid extracted with hot chloroform. The hot chloroform extract is combined with the filtrate and the mixture concentrated by distillation until 100 cc. volume remains in the flask. The residue is diluted with 200 cc. of methyl alcohol and the resulting solid refrigerated overnight. Upon filtering the methyl alcohol solution, 16 g. of crude product, melting point 180° C., is obtained. After 4 recrystallizations from hot benzene, 4.0 g. (20%) of spirilloxanthin (VIII) as a deep violet colored crystalline solid melting at 215° C. is obtained. The spirilloxanthin (VIII) is identical with a sample of spirilloxanthin obtained from natural sources as determined by mixed melting point and infrared spectra.

Variations in the process of the invention can be undertaken by those skilled in the art without departing from either the scope or the spirit of the invention.

This application is a division of application Serial No. 198,719, filed May 31, 1962.

I claim:

1. A process for the preparation of spirilloxanthin comprising the steps of
    (a) treating 6-methyl-5-hepten-2-one with methyl alcohol in an acidic medium to form 6-methoxy-6-methylheptan-2-one,
    (b) treating the latter compound with sodium metal and acetylene to form 3-hydroxy-7-methoxy-3,7-dimethylocta-1-yne,
    (c) hydrogenating the latter compound in the presence of a lead-palladium-calcium carbonate catalyst to form 3-hydroxy-7-methoxy-3,7-dimethylocta-1-ene,
    (d) reacting the latter compound with triphenyl phosphorus hydrobromide to give 7-methoxy-3,7-dimethylocta-2-en-1-yl triphenyl phosphorus bromide,
    (e) reacting the latter compound with crocetin dialdehyde to give 1,1'-dimethoxy-1,1',2,2'-tetrahydrolycopene, and
    (f) treating the latter compound with N-bromosuccinimide to give spirilloxanthin.

2. 3-hydroxy-7-methoxy-3,7-dimethylocta-1-yne.

3. 3-hydroxy-7-methoxy-3,7-dimethylocta-1-ene.

4. 7-methoxy-3,7-dimethylocta-2-en - 1 - yl triphenyl phosphorus bromide.

5. 1,1'-dimethoxy-1,1',2,2'-tetrahydrolycopene.

References Cited in the file of this patent

UNITED STATES PATENTS

| | | |
|---|---|---|
| 2,671,112 | Inhoffen et al. | Mar. 2, 1954 |
| 2,819,298 | Isler et al. | Jan. 7, 1958 |
| 2,857,423 | Isler et al. | Oct. 21, 1958 |

OTHER REFERENCES

Karrer et al.: Carotenoids, 1950, pp. 295–297.